(12) United States Patent
Chen (10) Patent No.: US 11,778,669 B2
(45) Date of Patent: Oct. 3, 2023

(54) RANDOM ACCESS METHOD, TERMINAL AND COMPUTER-READABLE STORAGE MEDIUM

(71) Applicant: VIVO MOBILE COMMUNICATION CO., LTD., Chang'an Dongguan (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/964,191

(22) Filed: Oct. 12, 2022

(65) Prior Publication Data

US 2023/0034065 A1 Feb. 2, 2023

Related U.S. Application Data

(63) Continuation of application No. 16/632,176, filed as application No. PCT/CN2018/095264 on Jul. 11, 2018, now Pat. No. 11,503,644.

(30) Foreign Application Priority Data

Jul. 17, 2017 (CN) .......................... 201710580673.2

(51) Int. Cl.
*H04W 4/00* (2018.01)
*H04W 74/08* (2009.01)
(Continued)

(52) U.S. Cl.
CPC ....... *H04W 74/0833* (2013.01); *H04W 24/08* (2013.01); *H04W 68/005* (2013.01); *H04W 72/046* (2013.01)

(58) Field of Classification Search
CPC ............. H04W 74/0833; H04W 24/08; H04W 68/005; H04W 72/046; H04W 72/0466;
(Continued)

(56) References Cited

U.S. PATENT DOCUMENTS 8,644,129 B2  2/2014  Dinan
9,867,197 B2  1/2018  Martin
(Continued)

FOREIGN PATENT DOCUMENTS

CN   105379357 A   3/2016
CN   106358216 A   1/2017
(Continued)

OTHER PUBLICATIONS

First Chinese Office Action related to Application No. 201710580673.2; dated Nov. 28, 2019.
(Continued)

*Primary Examiner* — Thai D Hoang
(74) *Attorney, Agent, or Firm* — von Briesen & Roper, s.c.

(57) ABSTRACT

A random access method, a terminal and a computer-readable storage medium are provided, related to the field of communication technologies. The random access method applied to a terminal includes: sending, to a base station, a random access preamble on a second beam, subsequent to sending a random access preamble on a first beam; monitoring and receiving, within a preset RAR time window, at least one RAR message sent by the base station.

18 Claims, 3 Drawing Sheets

(51) Int. Cl.
*H04W 24/08* (2009.01)
*H04W 68/00* (2009.01)
*H04W 72/044* (2023.01)

(58) Field of Classification Search
CPC ............. H04W 74/004; H04W 74/008; H04B 7/0695; H04B 7/0408
See application file for complete search history.

(56) References Cited

U.S. PATENT DOCUMENTS

| | | | |
|---|---|---|---|
| 10,142,962 | B2 | 11/2018 | Lee et al. |
| 2009/0259910 | A1 | 10/2009 | Lee et al. |
| 2010/0142470 | A1 | 6/2010 | Park et al. |
| 2011/0194501 | A1 | 8/2011 | Chung et al. |
| 2014/0126520 | A1 | 5/2014 | Quan et al. |
| 2014/0233452 | A1* | 8/2014 | Kim .................... H04W 36/06 370/312 |
| 2015/0016312 | A1 | 1/2015 | Li et al. |
| 2015/0078264 | A1 | 3/2015 | Han et al. |
| 2015/0085717 | A1 | 3/2015 | Papasakellariou et al. |
| 2015/0117374 | A1 | 4/2015 | Wu |
| 2015/0117410 | A1 | 4/2015 | Wu et al. |
| 2016/0029358 | A1 | 1/2016 | Hou et al. |
| 2016/0227580 | A1 | 8/2016 | Xiong et al. |
| 2017/0013643 | A1 | 1/2017 | Nan et al. |
| 2017/0251460 | A1* | 8/2017 | Agiwal ................ H04B 7/0617 |
| 2017/0273113 | A1 | 9/2017 | Tirronen et al. |
| 2017/0279646 | A1 | 9/2017 | Yi et al. |
| 2017/0280481 | A1 | 9/2017 | Stern-Berkowitz |
| 2017/0359836 | A1 | 12/2017 | Kato et al. |
| 2017/0359838 | A1 | 12/2017 | Xiao et al. |
| 2018/0077734 | A1* | 3/2018 | Kim ...................... H04L 1/188 |
| 2018/0176948 | A1* | 6/2018 | Islam .................. H04W 52/242 |
| 2018/0176949 | A1* | 6/2018 | Islam .................. H04W 74/0833 |
| 2018/0184306 | A1 | 6/2018 | Xiong et al. |
| 2019/0223212 | A1 | 7/2019 | Xiao et al. |
| 2019/0357200 | A1 | 11/2019 | Futaki et al. |
| 2020/0154326 | A1* | 5/2020 | Deenoo ................ H04W 36/08 |
| 2020/0260480 | A1* | 8/2020 | Wu .................... H04W 74/0833 |
| 2021/0212123 | A1* | 7/2021 | Reial .................... H04W 72/08 |

FOREIGN PATENT DOCUMENTS

| | | |
|---|---|---|
| EP | 3244685 A1 | 11/2017 |
| WO | 2016086144 A1 | 6/2016 |
| WO | 2017044155 A1 | 3/2017 |

OTHER PUBLICATIONS

Extended European Search Report related to Application No. 18835911.1; dated Jun. 16, 2020.
First United States Non-Final Office Action related to U.S. Appl. No. 16/632,176; dated Aug. 19, 2021.
Second United States Non-Final Office Action related to U.S. Appl. No. 16/632,176; dated Mar. 14, 2022.
Guangdong Oppo Mobile Telecom, "Discussion on Random Access Procedure for NR", Jan. 16-20, 2017, 3GPP TSG RAN WG1 NR Ad-Hoc Meeting, R1-1700548, Spokane, USA.
Guangdong Oppo Mobile Telecom, "NR 4-Step Random Access Procedure", May 15-19, 2017, 3GPP TSG RAN WG1 NR Ad-Hoc Meeting #89, R1-1707694, Hangzhou, P.R. China.
Samsung, "Considerations on contention-free random access", May 15-19, 2017, 3GPP TSG RAN WG1 Meeting #89, R1-1707937, Hangzhou, China.
Ericsson, "NR random access response design", May 15-19, 2017, 3GPP TSG-RAN WG1 Meeting #89, R1-1708731, Hangzhou, China.
CATT, "Further details on NR 4-step RA Procedure", Jun. 27-30, 2017, 3GPP TSG RAN WG1 NR Ad-Hoc#2, R1-1710035, Qingdao, P.R. China.
Intel Corporation, "4-step PRACH Procedures", Jun. 27-30, 2017, 3GPP TSG RAN WG1 NR Adhoc #2, R1-1710513, Qingdao, P.R. China.
Interdigital Inc., "Multiple Msg1 transmissions for one monitored RAR window", Jun. 20-27, 2017, 3GPP TSG-RAN WG1 NR Ad-Hoc #2, R1-1710871, Qingdao, P.R. China.
Samsung, "Random Access Procedure in NR", Aug. 22-26, 2016, 3GPP TSG-RAN WG2 Meeting #95, R2-164695, Gothenburg, Sweden.
Written Opinion and International Search Report related to Application No. PCT/CN2018/095264; dated Jan. 30, 2020.

* cited by examiner

RANDOM ACCESS METHOD, TERMINAL AND COMPUTER-READABLE STORAGE MEDIUM

CROSS REFERENCE OF RELATED APPLICATION

The present application claims the benefit of and is a continuation application of U.S. patent application Ser. No. 16/632,176 filed on Jan. 17, 2020 which is the U.S. national phase of PCT Application PCT/CN2018/095264 filed on Jul. 11, 2018, which claims a priority of Chinese patent application No. 201710580673.2 filed on Jul. 17, 2017, which is incorporated herein by reference in its entirety.

TECHNICAL FIELD

The present disclosure relates to the field of communication technologies, and in particular, to a random access method, a terminal and a computer-readable storage medium.

BACKGROUND

In the future 5 Generation (5G) mobile communication system, in order to achieve the goals of 20 Gbps downlink transmission and 10 Gbps uplink transmission rate, high-frequency communication and large-scale antenna technology will be introduced. High-frequency communication can provide a wider system bandwidth and smaller antenna size, which is more conducive to large-scale antenna deployment in base stations and user equipment (UE, also called terminals). High-frequency communication has the disadvantages of large path loss, susceptibility to interference, and fragile links. Large-scale antenna technology can provide a greater antenna gain. Therefore, the combination of high-frequency communication and large-scale antennas is an inevitable trend of the future 5G mobile communication systems.

Figure 1:
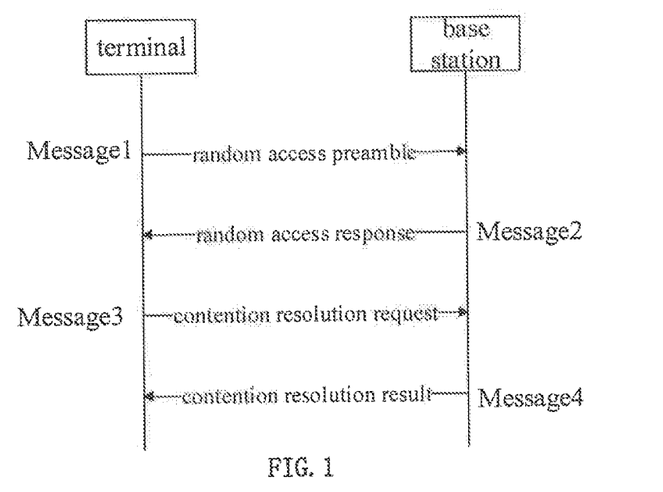
FIG. 1 is a schematic flowchart of a contention based RACH access process.

The current Random Access process is divided into contention based random access channel (RACH) access and contention free based RACH access. The contention based RACH access process is divided into 4 steps, as shown in FIG. 1, including:

Step 11: the terminal sends a Random Access Preamble, i.e., Message1;

Step 12: the base station feeds back a Random Access Response (RAR), i.e., Message 2;

Step 13: the terminal sends a contention resolution request to the base station, i.e., Message3.

Step 14: the terminal receives the contention resolution result of the base station, i.e., Message4.

Figure 2:
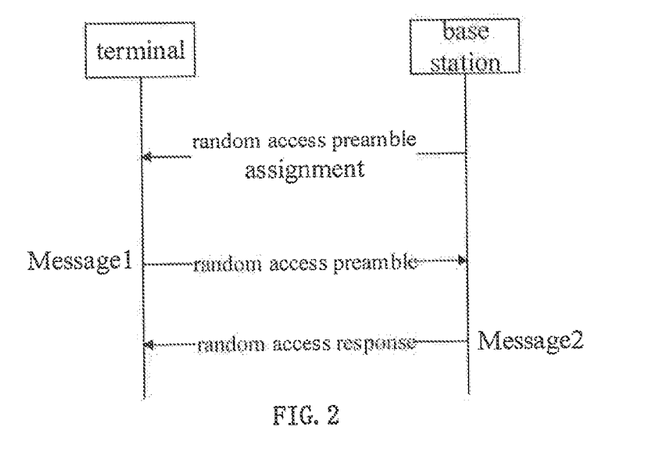
FIG. 2 is a schematic flowchart of a contention free based RACH access process.

The contention free based RACH access process is divided into two steps, as shown in FIG. 2, including:

Step 21: the terminal sends a random access preamble, i.e., Message1.

Step 22: the base station feeds back a random access response, i.e., Message2;

It should be noted that before step 21, the base station sends a random access (RA) Preamble assignment message to the terminal.

It should be noted that Message2 in the contention based RACH access and contention free based RACH access both sending the RAR, and the terminal monitors the RAR scrambled by the random access wireless network temporary identity (RA-RNTI) within the RAR window.

Due to the contention based RACH access, the terminal sends the same Preamble on the same physical random access channel (PRACH) resources. Therefore, after receiving Message2, it needs to send Message3 according to the uplink grant (UL grant) in message2, and the terminal will carry the identity of the terminal on Message3, and start a contention resolution timer while Message3 is sent. Before the contention resolution timer expires, if the message 4 sent by the base station is received, it is indicated that the contention resolution of the terminal is successful. The base station will carry the terminal identity in Message4, and the terminal can determine whether it is its own Message4 according to the terminal identity carried in Message4, thereby determining whether the competition is successful.

Figure 3:
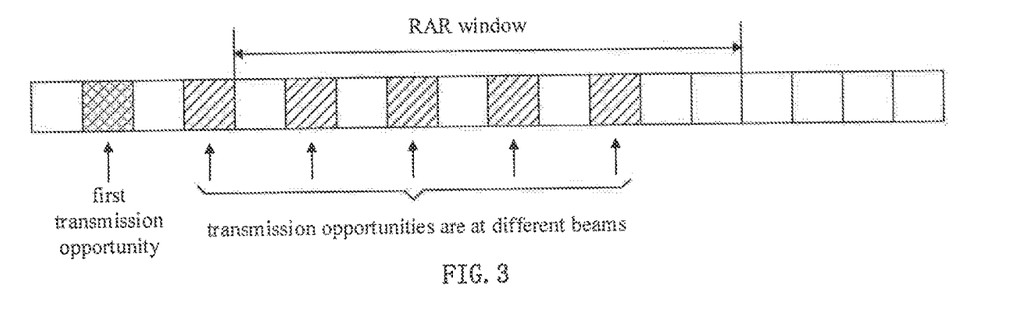
FIG. 3 is a schematic view of a time-domain of sending Message1 through a plurality of beams.

Due to the introduction of high frequencies in the new radio (NR), it is necessary to introduce beam transmission, where each beam may cover one direction. At present, there are plans to use a plurality of beams to send in random access processes, which can improve the access success rate of the terminal. For example, as shown in FIG. 3, Message1 is sent through a plurality of beams, that is, when the terminal sends Message1, Message1 is sent on a plurality of beams.

However, in the related art, the transmission through a plurality of beams does not consider the RAR window for monitoring a plurality of RA-RNTIs, whether a plurality of RARs will be received in the designed window, and how the terminal perform subsequent communication behaviors after the UL grants in a plurality of RARs are received.

SUMMARY

A random access method, a terminal and a non-transitory computer-readable storage medium are provided in the embodiments of the present disclosure, so as to solve the technical issue in the related art where a communication procedure of the transmission through a plurality of beams is not completed so the communication reliability cannot be guaranteed.

A random access method is provided in the embodiments of the present disclosure, applied to a terminal and including:

sending, to a base station, a random access preamble on a second beam, subsequent to sending a random access preamble on a first beam;

monitoring and receiving, within a preset Random Access Response (RAR) time window, at least one RAR message sent by the base station;

where the sending, to a base station, a random access preamble on a second beam, subsequent to sending a random access preamble on a first beam includes:

sending, to the base station, the random access preamble on the second beam, before a RAR time window corresponding to the random access preamble sending by the first beam expires;

where in the case that the random access preamble is sent to the base station on the second beam, the random access method further includes:

stopping a random access process on the first beam;

where the monitoring and receiving, within the preset RAR time window, at least one RAR message sent by the base station includes:

stopping monitoring the RAR message sent by the base station, within the RAR time window corresponding to the random access preamble sending by the first beam, and monitoring and receiving the RAR message which is sent by the base station and corresponding to the second beam on which the random access preamble is sent for the last time, within a RAR time window corresponding to the second beam on which the random access preamble is sent for the last time.

A terminal is further provided in the embodiments of the present disclosure, including: a memory, a processor and a computer program stored in the memory and executable by the processor, where the computer program is executed by the processor to:

send, to a base station, a random access preamble on a second beam, subsequent to sending a random access preamble on a first beam;

monitor and receive, within a preset Random Access Response (RAR) time window, at least one RAR message sent by the base station;

wherein the computer program is executed by the processor to:

send to the base station the random access preamble on the second beam, before a RAR time window corresponding to the random access preamble sending by the first beam expires;

wherein the random access preamble is sent to the base station on the second beam, the computer program is executed by the processor to:

stop a random access process on the first beam;

wherein the computer program is executed by the processor to:

stop monitoring the RAR message sent by the base station, within the RAR time window corresponding to the random access preamble sending by the first beam, and monitor and receive the RAR message which is sent by the base station and corresponding to the second beam on which the random access preamble is sent for the last time, within a RAR time window corresponding to the second beam on which the random access preamble is sent for the last time.

A non-transitory computer-readable storage medium is further provided in the embodiments of the present disclosure, where a computer program is stored in the computer-readable storage medium, and the computer program is executed by a processor to perform:

sending, to a base station, a random access preamble on a second beam, subsequent to sending a random access preamble on a first beam;

monitoring and receiving, within a preset Random Access Response (RAR) time window, at least one RAR message sent by the base station;

where the sending, to a base station, a random access preamble on a second beam, subsequent to sending a random access preamble on a first beam includes:

sending, to the base station, the random access preamble on the second beam, before a RAR time window corresponding to the random access preamble sending by the first beam expires;

where in the case that the random access preamble is sent to the base station on the second beam, the computer program is executed by the processor to perform:

stopping a random access process on the first beam;

where the monitoring and receiving, within the preset RAR time window, at least one RAR message sent by the base station includes:

stopping monitoring the RAR message sent by the base station, within the RAR time window corresponding to the random access preamble sending by the first beam, and monitoring and receiving the RAR message which is sent by the base station and corresponding to the second beam on which the random access preamble is sent for the last time, within a RAR time window corresponding to the second beam on which the random access preamble is sent for the last time.

DETAILED DESCRIPTION

The embodiments of the present disclosure will be described in details in the following with reference to the drawings and embodiments, so as to make the objective, the technical solution and the advantage of the present disclosure clearer.

A random access method, a terminal and a computer-readable storage medium are provided in the embodiments of the present disclosure, so as to solve the technical issue in the related art where the transmission through a plurality of beams does not consider the condition of sending the random access preamble to the base station on the second beam, the corresponding UE behavior, the design of the RAR window for monitoring a plurality RA-RNTIs, whether a plurality RARs will be received in the designed window, and how the terminal perform subsequent communication behaviors after the UL grants in a plurality of RARs are received, resulting in that a communication procedure of the transmission through a plurality of beams is not completed so the communication reliability cannot be guaranteed.

Figure 4:
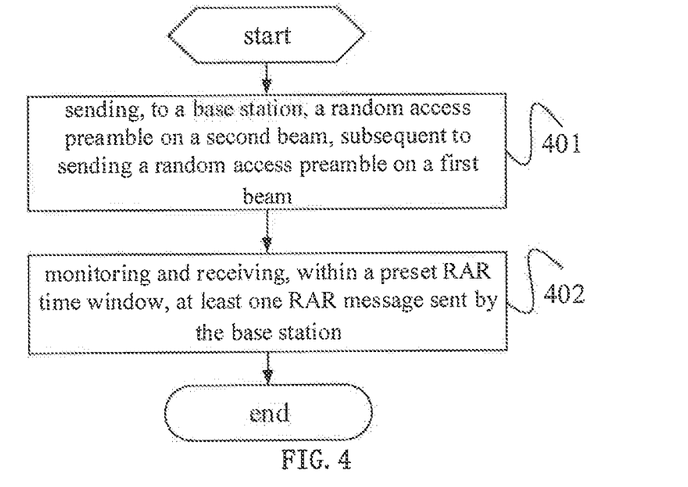
FIG. 4 is a flowchart of a random access method in the embodiments of the present disclosure.

As shown in FIG. 4, a random access method is provided in the embodiments of the present disclosure, which is applied to a terminal and includes:

Step 401: sending, to a base station, a random access preamble on a second beam, subsequent to sending a random access preamble on a first beam.

It should be noted that, in this step, the terminal may choose to perform another random access process on the second beam when the random access process on the first beam fails or after the random access process on the first beam fails, or may perform the random access process on the second beam directly without considering the random access process on the first beam.

Step 402: monitoring and receiving, within a preset RAR time window, at least one RAR message sent by the base station.

It should be noted that, within the preset RAR time window, the base station may send only one RAR message, or may send a plurality of RAR messages.

The random access method in the embodiments of the present disclosure will be described in details in the following from a perspective of different implementations of Step 401.

Case 1: Step 401 may further include: sending, to the base station, the random access preamble on the second beam, in the case that a RAR time window corresponding to the random access preamble sending by the first beam expires and the terminal does not receive the RAR message.

In this case, the condition for the terminal to choose to send the random access preamble on the second beam is: a RAR time window corresponding to the random access preamble sending by the first beam expires and the terminal does not receive the RAR message. That is, the terminal first sends a random access preamble on the first beam. Correspondingly, the terminal may monitor the RAR message fed back by the base station within the RAR time window corresponding to the random access preamble sending by the first beam. In the case that the terminal still does not receive the RAR message fed back by the base station when this RAR time window expires, the terminal needs to select another beam to re-initiate the random access process, and retransmit the random access preamble to the base station.

Specifically, in this case, Step 402 further includes: monitoring and receiving at least one RAR message sent by the base station, within a RAR time window corresponding to the random access preamble sending by the second beam.

It should be noted that the RAR message, scrambled by the random access wireless network temporary identity (RA-RNTI) is sent by the base station to the terminal.

In case 1, the terminal does not receive the RAR message on one beam and selects a new beam for the random access, and only receives the RAR message within the RAR time window corresponding to the random access preamble sending by the new beam, so the implementation is relatively simple and does not increase the resource overhead of the terminal.

Case 2: Step 401 further includes: sending, to the base station, the random access preamble on the second beam, before a RAR time window corresponding to the random access preamble sending by the first beam expires.

It should be noted that the RAR time window corresponding to the random access preamble sending by the first beam expires means that the time point of sending the random access preamble to the base station by the second beam is a time point before the RAR time window corresponding to the random access preamble sending by the first beam; or the time point of sending the random access preamble to the base station on the second beam is a time point within the RAR time window corresponding to the random access preamble sending by the first beam.

In this case, when the terminal selects another beam for the random access, it does not consider whether the random access on the previous beam is successful. Correspondingly, the terminal may stop or not stop the random access process on the previous beam (i.e., the first beam).

1. The terminal stops the random access process on the previous beam.

In this case, Step 402 further includes:

stopping monitoring the RAR message sent by the base station, within the RAR time window corresponding to the random access preamble sending by the first beam, and monitoring and receiving the RAR message which is sent by the base station and corresponding to the second beam on which the random access preamble is sent for the last time, within a RAR time window corresponding to the second beam on which the random access preamble is sent for the last time.

When the terminal stops the random access process on the previous beam, the terminal does not need to monitor the RAR message fed back by the base station for the previous beam, and the terminal only needs to monitor the RAR message fed back by the base station for the beam in the last time of random access process. This method does not consider the status of the random access process on the previous beam when changing the beam for the random access process, therefore the terminal does not need to monitor too many RAR messages at the same time.

2. The terminal continues the random access process on the previous beam.

In this case, Step 402 may further include:

A. monitoring and receiving, within a preset RAR time window, a plurality of RAR messages which are scrambled by a plurality of RA-RNTIs and sent by the base station;

It should be noted that, in this case, the RAR messages received by the terminal are considered as valid RAR messages.

B. monitoring, within a preset RAR time window, a plurality of RAR messages which are scrambled by a plurality of RA-RNTIs and sent by the base station, and stopping receiving the RAR messages after receiving one RAR message sent by the base station.

In this case, the terminal monitors, within a preset RAR time window, a plurality of RAR messages which are scrambled by a plurality of RA-RNTIs and sent by the base station, and will no longer monitor and receive the RAR messages after receiving one RAR message. For example, in the case that the terminal determines the first received RAR message as a valid RAR message within a preset RAR time window, the terminal will not monitor other RAR messages sent by the base station within the preset RAR time window.

C. monitoring and receiving, within a preset RAR time window, a plurality of RAR messages which are scrambled by a plurality of RA-RNTIs and sent by the base station, and determining the last received RAR message as a valid RAR message.

In this case, the terminal will still receive a plurality of RAR messages, but only the last received RAR message may be determined as a valid RAR message, while other RAR messages are discarded.

It should be noted that, the preset RAR time window may be the RAR time window corresponding to the beam on which the random access preamble is sent for the first time. There may be a plurality of preset RAR time windows, that is, the RAR time windows corresponding to every beams on which the random access preambles are sent. There may be one or more preset RAR time windows. When there is one preset RAR time window, a start time point of the preset RAR time window is a start time point of the RAR time window corresponding to a beam on which a preamble is sent for the first time, and/or an end time point of the preset RAR time window is an end time point of the RAR time window corresponding to the beam on which the preamble is sent for the last time.

It should be noted that, in practical applications, the terminal selects the above implementation manners according to a specific communication scenario to ensure that the adopted manner meets communication requirements.

It should also be noted that, for the contention based RACH access process, the random access method in the embodiment of the present disclosure further includes:

sending at least one third message to the base station.

It should be noted that the third message here refers to a contention resolution request message in the random access process, i.e., Message3.

For the above different situations, the number of third messages sent will also be different.

1. When the terminal receives only one RAR message or determines only one RAR message as a valid RAR message, the terminal sends one third message to the base station.

It should be noted that the third message needs to be sent at the resource location indicated by the uplink (UL) grant in the RAR message.

2. When the terminal receives a plurality of RAR messages, the terminal sends at least one third message to the base station. When the terminal sends one third message to the base station, the terminal selects an uplink grant corresponding to one RAR message. When the terminal sends a plurality of third messages to the base station, the terminal sends a third message to the base station at the resource location indicated by the uplink grant in each RAR message. In this case, the terminal may send a third message for each RAR message, so as to improve the success rate of random access and reduce the delay of random access.

According to the embodiments of the present disclosure, by monitoring and receiving, within a RAR time window, at least one RAR message sent by a base station, the monitoring for a plurality of RAR messages and the corresponding RAR window designs in the transmission through multiple beams are implemented, thereby enabling the terminal to access the network faster, improving the effectiveness of the system, and the use of a plurality of RAR messages also improves the reliability of accessing the network by the terminal.

Figure 5:
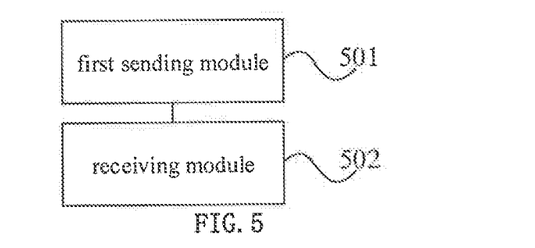
FIG. 5 is a first schematic view of modules of a terminal in the embodiments of the present disclosure.
Figure 6:
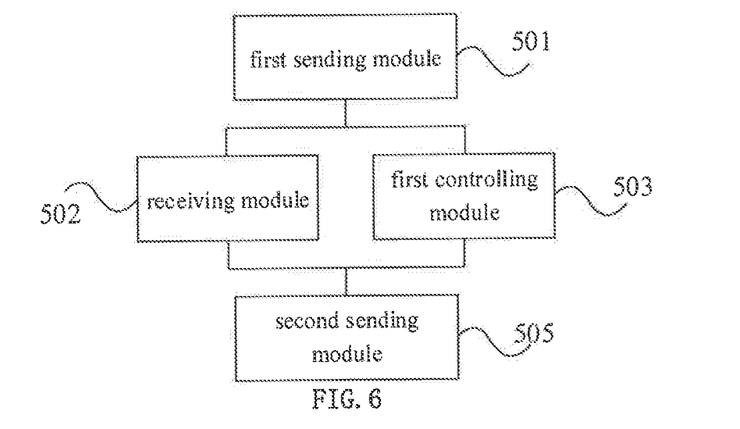
FIG. 6 is a second schematic view of modules of a terminal in the embodiments of the present disclosure.
Figure 7:
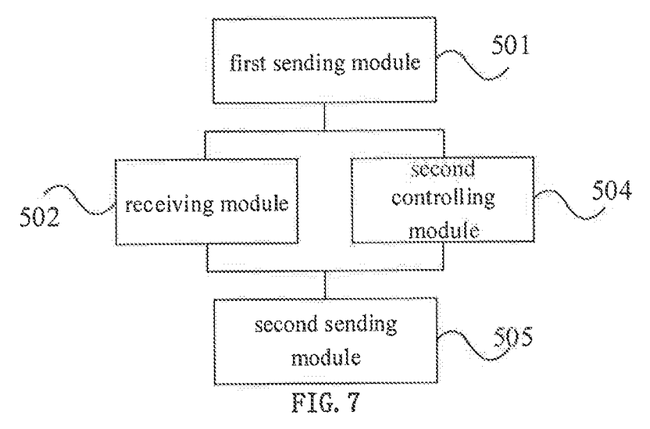
FIG. 7 is a third schematic view of modules of a terminal in the embodiments of the present disclosure.

As shown in FIG. 5 to FIG. 7, a terminal is provided in the embodiments of the present disclosure, including:
- a first sending module 501, configured to send, to a base station, a random access preamble on a second beam, subsequent to sending a random access preamble on a first beam;
- a receiving module 502, configured to monitor and receive, within a preset RAR time window, at least one RAR message sent by the base station.

Optionally, the first sending module 501 is configured to:
send to the base station the random access preamble on the second beam, in the case that a RAR time window corresponding to the random access preamble sending by the first beam expires and the terminal does not receive the RAR message.

Optionally, the receiving module 501 is configured to:
monitor and receive at least one RAR message sent y the base station, within a RAR time window corresponding to the random access preamble sending by the second beam.

Optionally, the first sending module 501 is configured to:
send to the base station the random access preamble on the second beam, before a RAR time window corresponding to the random access preamble sending by the first beam expires.

Optionally, the random access preamble is sent to the base station on the second beam by the first sending module 501, the terminal further includes:
- a first controlling module 503, configured to stop a random access process on the first beam;
- where the receiving module 502 is configured to:
  stop monitoring the RAR message sent by the base station, within the RAR time window corresponding to the random access preamble sending by the first beam, and
  monitor and receive the RAR message which is sent by the base station and corresponding to the second beam on which the random access preamble is sent for the last time, within a RAR time window corresponding to the second beam on which the random access preamble is sent for the last time.

Optionally, the random access preamble is sent to the base station on the second beam by the first sending module 501, the terminal further includes:
- a second controlling module 504, configured to continue a random access process on the first beam;
- where the receiving module is configured to:
  monitor and receive, within the preset RAR time window, a plurality of RAR messages sent by the base station; or
  stop receiving the RAR message, after monitoring and receiving within the preset RAR time window one RAR message sent by the base station; or
  monitor and receive, within the preset RAR time window, a plurality of RAR messages sent by the base station, and determine the last received RAR message as a valid RAR message.

Optionally, there exists one or more preset RAR time windows;
in the case that there exists one preset RAR time window, a start time point of the preset RAR time window is a start time point of the RAR time window corresponding to a beam on which a preamble is sent for the first time, and/or
an end time point of the preset RAR time window is an end time point of the RAR time window corresponding to a beam on which a preamble is sent for the last time.

Optionally, the terminal further includes:
a second sending module 505, configured to send at least one third message to the base station.

Optionally, the second sending module SOS is configured to:
send one third message to the base station in the case that the terminal receives only one RAR message or determines only one RAR message as a valid RAR message.

Optionally, the second sending module 505 is configured to:
send at least one third message to the base station in the case that the terminal receives a plurality of RAR messages.

It should be noted that the terminal in the embodiments is a terminal corresponding to the above-mentioned random access method applied on the terminal side. All implementation methods of the above embodiments are applicable to this terminal embodiment and can also achieve the same technical effect as the terminal embodiment.

A terminal is further provided in the embodiments of the present disclosure, including: a memory, a processor and a computer program stored in the memory and executable on the processor, the computer program is executed by the processor to perform the above random access method at the terminal side, which can achieve the same technical effect, and details thereof are omitted herein.

A computer-readable storage medium is further provided in the embodiments of the present disclosure, where a computer program is stored in the computer-readable storage medium, and the computer program is executed by a processor to perform the random access method at the terminal side, which can achieve the same technical effect, and details thereof are omitted herein. The computer-readable storage medium may include a read-only memory (ROM), a random access memory (RAM), a magnetic disk or an optical disk.

Figure 8:
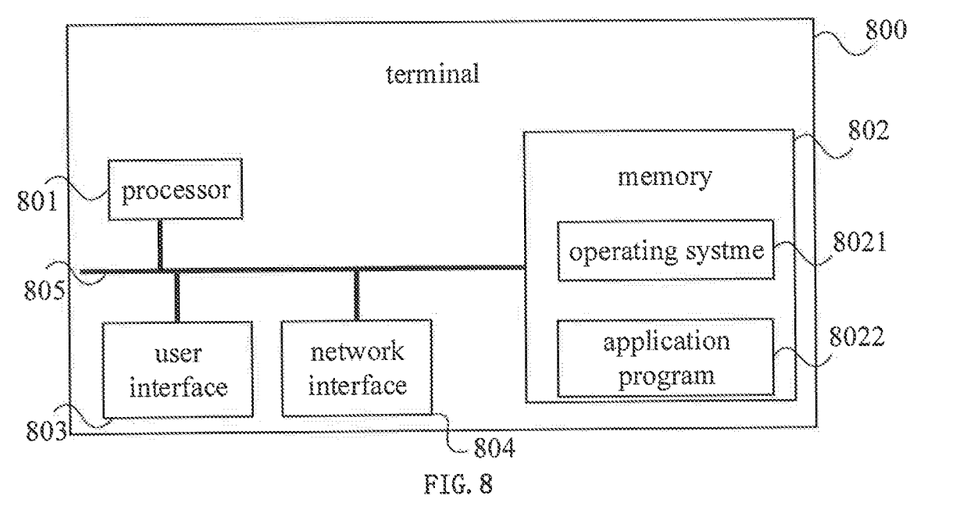
FIG. 8 is a schematic view of a terminal in the embodiments of the present disclosure.

As shown in FIG. 8 which is a schematic view of a terminal in the embodiments of the present disclosure. The application entity of the random access method of the present disclosure is specifically described below with reference to the drawing.

The terminal 800 shown in FIG. 8 includes: at least one processor 801, a memory 802, at least one network interface 804, and a user interface 803. The various components in the terminal 800 are coupled together through a bus system 805. It can be understood that the bus system 805 is used to implement connection and communication between these components. The bus system 805 includes a power bus, a control bus, and a status signal bus in addition to the data bus. However, for the sake of clarity, various buses are marked as the bus system 805 in FIG. 8.

The user interface 803 may include a display, a keyboard, or a pointing device (for example, a mouse, a track ball, a touch panel, or a touch screen).

It can be understood that the memory 802 in the embodiment of the present disclosure may be a volatile memory or a non-volatile memory, or may include both volatile and non-volatile memories. The non-volatile memory may be a read-only memory (ROM), a programmable mad-only memory (PROM), an erasable programmable read-only memory (EROM), or Erase programmable EPROM (EEPROM) or flash memory. The volatile memory may be a Random Access Memory (RAM), which is used as an external cache. By way of example, but not limitation, many forms of RAM are available, such as Static Random Access Memory (SRAM), Dynamic Random Access Memory (DRAM), Synchronous Dynamic Random Access Memory (SDRAM), double data rate synchronous dynamic random access memory (DDRSDRAM), enhanced synchronous dynamic random access memory (ESDRAM), synchronous connection dynamic random access memory (SLDRAM), and Direct memory bus random access memory (DRRAM). The memory 802 of the systems and methods described herein is intended to include, but is not limited to, these and any other suitable types of memory.

In some embodiments, the memory 802 stores the following elements, executable modules or data structures, or a subset of them, or their extended set: an operating system 8021 and an application program 8022.

The operating system 8021 includes various system programs, such as a framework layer, a core library layer, and a driver layer, etc., for implementing various basic services and processing hardware-based tasks. The application program 8022 includes various application programs, such as a media player and a browser, and is used to implement various application services. A program for implementing the method of the embodiment of the present disclosure may be included in an application program 8022.

In the embodiment of the present disclosure, the mobile terminal 800 further includes: a computer program stored in the memory 802 and executable on the processor 801. Specifically, the computer program may be a computer control program in the application program 8022, and the computer program is executed by the processor 801 to:
send, to a base station, a random access preamble on a second beam, subsequent to sending a random access preamble on a first beam;
monitor and receive, within a preset RAR time window, at least one Random Access Response (RAR) message sent by the base station.

The method disclosed in the foregoing embodiment of the present disclosure may be applied to the processor 801, or implemented by the processor 801. The processor 801 may be an integrated circuit chip and has a signal processing capability. In the implementation process, each step of the above method may be completed by an integrated logic circuit of hardware in the processor 801 or an instruction in the form of software. The processor 801 may be a general-purpose processor, a digital signal processor (DSP), an application specific integrated circuit (ASIC), a Field Programmable Gate Array (FPGA), or other Programming logic devices, discrete gate or transistor logic devices, discrete hardware components. Various methods, steps, and logical block diagrams disclosed in the embodiments of the present disclosure may be implemented or executed. A general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. The software module may be located in a mature computer-readable storage medium such as a random access memory, a flash memory, a read-only memory, a programmable read-only memory, or an electrically erasable programmable memory, a register, and the like in the art. The computer-readable storage medium is located in the memory 802, and the processor 801 reads the information in the memory 802 and completes the steps of the foregoing method in combination with its hardware. Specifically, a computer program is stored on the computer-readable storage medium, and when the computer program is executed by the processor 801, the following steps are implemented.

It can be understood that the embodiments described herein may be implemented by hardware, software, firmware, middleware, microcode, or a combination thereof. For hardware implementation, the processing unit can be implemented in one or more Application Specific Integrated Circuits (ASIC), Digital Signal Processing (DSP), Digital Signal Processing Device (DSPD), and Programmable Logic Device (PLD), Field Programmable Gate Array (FPGA), general-purpose processor, controller, microcontroller, microprocessor, other electronic unit for performing the functions described in this application or the combination thereof.

For software implementation, the techniques described herein can be implemented through modules (e.g., procedures, functions, etc.) that perform the functions described herein. Software codes may be stored in a memory and executed by a processor. The memory may be implemented in the processor or external to the processor.

Optionally, the computer program is executed by the processor 801 to: send to the base station the random access preamble on the second beam, in the case that a RAR time window corresponding to the random access preamble sending by the first beam expires and the terminal does not receive the RAR message.

Optionally, the computer program is executed by the processor 801 to: monitor and receive at least one RAR message sent by the base station, within a RAR time window corresponding to the random access preamble sending by the second beam.

Optionally, the computer program is executed by the processor 801 to: send to the base station the random access preamble on the second beam, before a RAR time window corresponding to the random access preamble sending by the first beam expires.

Optionally, the random access preamble is sent to the base station on the second beam, the computer program is executed by the processor 801 to: stop a random access process on the first beam; stop monitoring the RAR message sent by the base station, within the RAR time window corresponding to the random access preamble sending by the first beam, and monitor and receive the RAR message which is sent by the base station and corresponding to the second beam on which the random access preamble is sent for the last time, within a RAR time window corresponding to the second beam on which the random access preamble is sent for the last time.

Optionally, the random access preamble is sent to the base station on the second beam, the computer program is executed by the processor 801 to: continue a random access process on the first beam; monitor and receive, within the preset RAR time window, a plurality of RAR messages sent by the base station; or stop receiving the RAR message, after monitoring and receiving within the preset RAR time window one RAR message sent by the base station; or monitor and receive, within the preset RAR time window, a plurality of RAR messages sent by the base station, and determine the last received RAR message as a valid RAR message.

Optionally, there exists one or more preset RAR time windows;

in the case that there exists one preset RAR time window, a start time point of the preset RAR time window is a start time point of the RAR time window corresponding to a beam on which a preamble is sent for the first time, and/or an end time point of the preset RAR time window is an end time point of the RAR time window corresponding to a beam on which a preamble is sent for the last time.

Optionally, the computer program is executed by the processor 801 to: send at least one third message to the base station.

Optionally, the computer program is executed by the processor 801 to: send one third message to the base station in the case that the terminal receives only one RAR message or determines only one RAR message as a valid RAR message.

Optionally, the computer program is executed by the processor 801 to: send at least one third message to the base station in the case that the terminal receives a plurality of RAR messages.

The terminal 800 may implement the processes performed by the terminal in the above embodiments, and the detailed description are omitted herein.

According to the terminal in the embodiments of the present disclosure, by monitoring and receiving, within a RAR time window, at least one RAR message sent by a base station, the monitoring for a plurality of RAR messages and the corresponding RAR window designs in the transmission through multiple beams are implemented, thereby enabling the terminal to access the network faster, improving the effectiveness of the system, and the use of a plurality of RAR messages also improves the reliability of accessing the network by the terminal.

Each embodiment in this specification is described in a progressive manner. Each embodiment focuses on the differences from other embodiments, and the same or similar parts between the various embodiments may refer to each other.

Those skilled in the art should understand that the embodiments of the embodiments of the present disclosure may be provided as a method, an apparatus, or a computer program product. Therefore, the embodiments of the present disclosure may take the form of an entirely hardware embodiment, an entirely software embodiment, or an embodiment combining software and hardware aspects. Moreover, the embodiments of the present disclosure may take the form of a computer program product implemented on one or more computer-usable storage media (including but not limited to disk storage, CD-ROM, optical storage, etc.) containing computer-usable program code.

Embodiments of the present disclosure are described with reference to flowcharts and/or block diagrams of methods, terminal devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions may be provided to a processor of a general purpose computer, special purpose computer, embedded processor, or other programmable data processing terminal device to produce a machine, such that the instructions executed by the processor of the computer or other programmable data processing terminal device are generated for implementing the functions specified in one or more flowcharts and/or one or more blocks of the block diagrams.

These computer program instructions may also be stored in a computer-readable memory capable of directing a computer or other programmable data processing terminal device to work in a specific manner, such that the instructions stored in the computer-readable memory produce a manufactured article including the instruction means, the instruction means implements the functions specified in one or more flowcharts and/or one or more blocks of the block diagram.

These computer program instructions can also be loaded on a computer or other programmable data processing terminal device, so that a series of operation steps can be performed on the computer or other programmable terminal device to produce a computer-implemented process, so that the computer or other programmable terminal device can The instructions executed on the steps provide steps for implementing the functions specified in one or more of the flowcharts and/or one or more of the block diagrams.

Although some embodiments of the present disclosure have been described, those skilled in the art can make other changes and modifications to these embodiments once they know the basic inventive concepts. Therefore, the appended claims are intended to be construed to include the embodiments and all changes and modifications that fall within the scope of the embodiments of the disclosure.

It should also be noted that in this article, relational terms such as first and second are used only to distinguish one entity or operation from another entity or operation, and do not necessarily require or imply these entities or operations There is any such actual relationship or order among them. Moreover, the terms "including", "comprising", or any other variation thereof are intended to encompass non-exclusive inclusion, such that a process, method, article, or terminal device that includes a series of elements includes not only those elements but also those that are not explicitly listed Other elements, or elements inherent to such a process, method, article, or terminal. Without more restrictions, the elements defined by the sentence "including a . . . " do not exclude the existence of other identical elements in the process, method, article, or terminal device including the elements.

The above are only some embodiments of the present disclosure, and it should be noted that those skilled in the art may also make several improvements and refinements without departing from the principles of the present disclosure, which should also be considered as the scope of the present disclosure.

What is claimed is:

1. A random access method, applied to a terminal and comprising:
    sending, to a base station, a random access preamble on a second beam, subsequent to sending a random access preamble on a first beam;
    monitoring and receiving, within a preset Random Access Response (RAR) time window, at least one RAR message sent by the base station;
    wherein the sending, to a base station, a random access preamble on a second beam, subsequent to sending a random access preamble on a first beam comprises:
    sending, to the base station, the random access preamble on the second beam, before a RAR time window corresponding to the random access preamble sending by the first beam expires;
    wherein in the case that the random access preamble is sent to the base station on the second beam, the random access method further comprises:
    stopping a random access process on the first beam;
    wherein the monitoring and receiving, within the preset RAR time window, at least one RAR message sent by the base station comprises:
    stopping monitoring the RAR message sent by the base station, within the RAR time window corresponding to the random access preamble sending by the first beam, and
    monitoring and receiving the RAR message which is sent by the base station and corresponding to the second beam on which the random access preamble is sent for the last time, within a RAR time window corresponding to the second beam on which the random access preamble is sent for the last time.

2. The random access method according to claim 1, wherein the sending to the base station the random access preamble on the second beam subsequent to sending the random access preamble on the first beam comprises:
    sending, to the base station, the random access preamble on the second beam, in the case that a RAR time window corresponding to the random access preamble sending by the first beam expires and the terminal does not receive the RAR message.

3. The random access method according to claim 2, wherein the monitoring and receiving, within a preset RAR time window, at least one RAR message sent by the base station comprises:
    monitoring and receiving at least one RAR message sent by the base station, within a RAR time window corresponding to the random access preamble sending by the second beam.

4. The random access method according to claim 1, wherein subsequent to the monitoring and receiving, within a preset RAR time window, at least one RAR message sent by the base station, the method further comprises:
    sending at least one third message to the base station.

5. The random access method according to claim 4, wherein the sending at least one third message to the base station comprises:
    sending one third message to the base station in the case that the terminal receives only one RAR message or determines only one RAR message as a valid RAR message.

6. The random access method according to claim 4, wherein the sending at least one third message to the base station comprises:
    sending at least one third message to the base station in the case that the terminal receives a plurality of RAR messages.

7. A terminal, comprising: a memory, a processor and a computer program stored in the memory and executable by the processor, wherein the computer program is executed by the processor to:
    send, to a base station, a random access preamble on a second beam, subsequent to sending a random access preamble on a first beam;
    monitor and receive, within a preset Random Access Response (RAR) time window, at least one RAR message sent by the base station;
    wherein the computer program is executed by the processor to:
    send to the base station the random access preamble on the second beam, before a RAR time window corresponding to the random access preamble sending by the first beam expires;
    wherein the random access preamble is sent to the base station on the second beam, the computer program is executed by the processor to:
    stop a random access process on the first beam;
    wherein the computer program is executed by the processor to:
    stop monitoring the RAR message sent by the base station, within the RAR time window corresponding to the random access preamble sending by the first beam, and
    monitor and receive the RAR message which is sent by the base station and corresponding to the second beam on which the random access preamble is sent for the last time, within a RAR time window corresponding to the second beam on which the random access preamble is sent for the last time.

8. The terminal according to claim 7, wherein the computer program is executed by the processor to:
    send to the base station the random access preamble on the second beam, in the case that a RAR time window corresponding to the random access preamble sending by the first beam expires and the terminal does not receive the RAR message.

9. The terminal according to claim 7, wherein the computer program is executed by the processor to:
    monitor and receive at least one RAR message sent by the base station, within a RAR time window corresponding to the random access preamble sending by the second beam.

10. The terminal according to claim 7, wherein the computer program is executed by the processor to:
    send at least one third message to the base station.

11. The terminal according to claim 10, wherein the computer program is executed by the processor:
send one third message to the base station in the case that the terminal receives only one RAR message or determines only one RAR message as a valid RAR message.

12. The terminal according to claim 10, wherein the computer program is executed by the processor to:
send at least one third message to the base station in the case that the terminal receives a plurality of RAR messages.

13. A non-transitory computer-readable storage medium, wherein a computer program is stored in the computer-readable storage medium, and the computer program is executed by a processor to perform:
sending, to a base station, a random access preamble on a second beam, subsequent to sending a random access preamble on a first beam;
monitoring and receiving, within a preset Random Access Response (RAR) time window, at least one RAR message sent by the base station;
wherein the sending, to a base station, a random access preamble on a second beam, subsequent to sending a random access preamble on a first beam comprises:
sending, to the base station, the random access preamble on the second beam, before a RAR time window corresponding to the random access preamble sending by the first beam expires;
wherein in the case that the random access preamble is sent to the base station on the second beam, the computer program is executed by the processor to perform:
stopping a random access process on the first beam;
wherein the monitoring and receiving, within the preset RAR time window, at least one RAR message sent by the base station comprises:
stopping monitoring the RAR message sent by the base station, within the RAR time window corresponding to the random access preamble sending by the first beam, and
monitoring and receiving the RAR message which is sent by the base station and corresponding to the second beam on which the random access preamble is sent for the last time, within a RAR time window corresponding to the second beam on which the random access preamble is sent for the last time.

14. The non-transitory computer-readable storage medium according to claim 13, wherein the sending to the base station the random access preamble on the second beam subsequent to sending the random access preamble on the first beam comprises:
sending, to the base station, the random access preamble on the second beam, in the case that a RAR time window corresponding to the random access preamble sending by the first beam expires and the terminal does not receive the RAR message.

15. The non-transitory computer-readable storage medium according to claim 14, wherein the monitoring and receiving, within a preset RAR time window, at least one RAR message sent by the base station comprises:
monitoring and receiving at least one RAR message sent by the base station, within a RAR time window corresponding to the random access preamble sending by the second beam.

16. The non-transitory computer-readable storage medium according to claim 13, wherein subsequent to the monitoring and receiving, within a preset RAR time window, at least one RAR message sent by the base station, the computer program is executed by the processor to perform:
sending at least one third message to the base station.

17. The non-transitory computer-readable storage medium according to claim 16, wherein the sending at least one third message to the base station comprises:
sending one third message to the base station in the case that the terminal receives only one RAR message or determines only one RAR message as a valid RAR message.

18. The non-transitory computer-readable storage medium according to claim 16, wherein the sending at least one third message to the base station comprises:
sending at least one third message to the base station in the case that the terminal receives a plurality of RAR messages.

* * * * *